(12) United States Patent
Tai

(10) Patent No.: US 7,133,619 B2
(45) Date of Patent: Nov. 7, 2006

(54) POLARIZATION MODE DISPERSION COMPENSATION MODULE

(75) Inventor: Shu-Lin Tai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 679 days.

(21) Appl. No.: 10/193,505

(22) Filed: Jul. 10, 2002

(65) Prior Publication Data

US 2004/0008993 A1 Jan. 15, 2004

(51) Int. Cl.
*H04B 10/12* (2006.01)

(52) U.S. Cl. .............. 398/147; 398/152; 398/102; 398/158; 398/159; 398/161; 398/79; 398/65; 398/81; 359/483; 359/499; 359/487; 359/489; 385/11; 385/15; 385/27; 385/37

(58) Field of Classification Search ........... 398/152, 398/158, 159, 81, 147, 102, 65, 161, 29; 359/483, 487, 489, 499; 385/11, 15, 27, 385/37
See application file for complete search history.

(56) References Cited

U.S. PATENT DOCUMENTS

| 5,859,939 | A * | 1/1999 | Fee et al. ............... 385/24 |
| 6,266,457 | B1 * | 7/2001 | Jacob ............... 385/11 |
| 6,385,357 | B1 * | 5/2002 | Jopson et al. ........... 385/11 |
| 6,704,143 | B1 * | 3/2004 | Han et al. ............... 359/499 |
| 2002/0075477 | A1 * | 6/2002 | Yu et al. ............... 356/73.1 |

\* cited by examiner

*Primary Examiner*—Hanh Phan
(74) *Attorney, Agent, or Firm*—Wei Te Chung

(57) ABSTRACT

An operation unit of a PMD compensation module includes a PBS (polarization beam splitter), a compensating part and a combiner. The PBS separates an optical input into a first polarized signal and a second polarized signal. The compensating part includes a fixed prism and a movable prism. The first polarized signal outputted from the PBS travels through the fixed prism and the movable prism in series. The light path of the first polarized signal in the movable prism is elongated or shortened according to a position of the movable prism. A continuously variable delay can thus be applied between the first and second polarized signals. The combiner recombines the first polarized signal received from the compensating part and the second polarized signal received from the PBS into an optical output signal.

17 Claims, 3 Drawing Sheets

POLARIZATION MODE DISPERSION COMPENSATION MODULE

BACKGROUND OF THE INVENTION

1. Field of the Invention

The present invention relates to a dispersion compensation module, and particularly to a polarization mode dispersion (PMD) compensation module that can provide a continuously variable compensation.

2. Description of Related Art

Optical communication systems are evolving from 10 Gbit/s systems to 40 Gbit/s systems to meet the demand for transmission capability. As the transmission speed of optical signals has increased, PMD has become one of the most important limiting factors for high-speed optical communication systems. Therefore, PMD compensation is a high priority concern in a high-speed optical communication system.

U.S. Pat. No. 5,822,100 discloses a PMD compensator which splits a received optical signal into two polarization states and which uses optical switching to add increments of delay to either polarization state of the signal. However, the delay of the PMD compensator is not continuously variable.

Therefore, an improved PMD compensation module is required to overcome the disadvantage of the prior art.

SUMMARY OF THE INVENTION

Accordingly, an object of the present invention is to provide a PMD compensation module which can apply a continuously variable delay to one of the two polarized signals of an optical input signal.

In order to achieve the object set forth, a PMD compensation module comprises a polarization beam splitter (PBS), a compensating part and a combiner. The PBS separates an optical input into a first polarized signal and a second polarized signal. The first polarized signal and the second polarized signal are polarized orthogonally with respect to one another. The compensating part further comprises a fixed prism and a movable prism. The first polarized signal outputted from the PBS travels through the fixed prism and the movable prism, in series. The light path of the first polarized signal in the movable prism is elongated or shortened according to a position of the movable prism. The combiner recombines the first polarized signal received from the compensating part and the second polarized signal received from a second adjustable crystal.

Other objects, advantages and novel features of the invention will become more apparent from the following detailed description when taken in conjunction with the accompanying drawings.

DETAILED DESCRIPTION OF THE INVENTION

Figure 1:
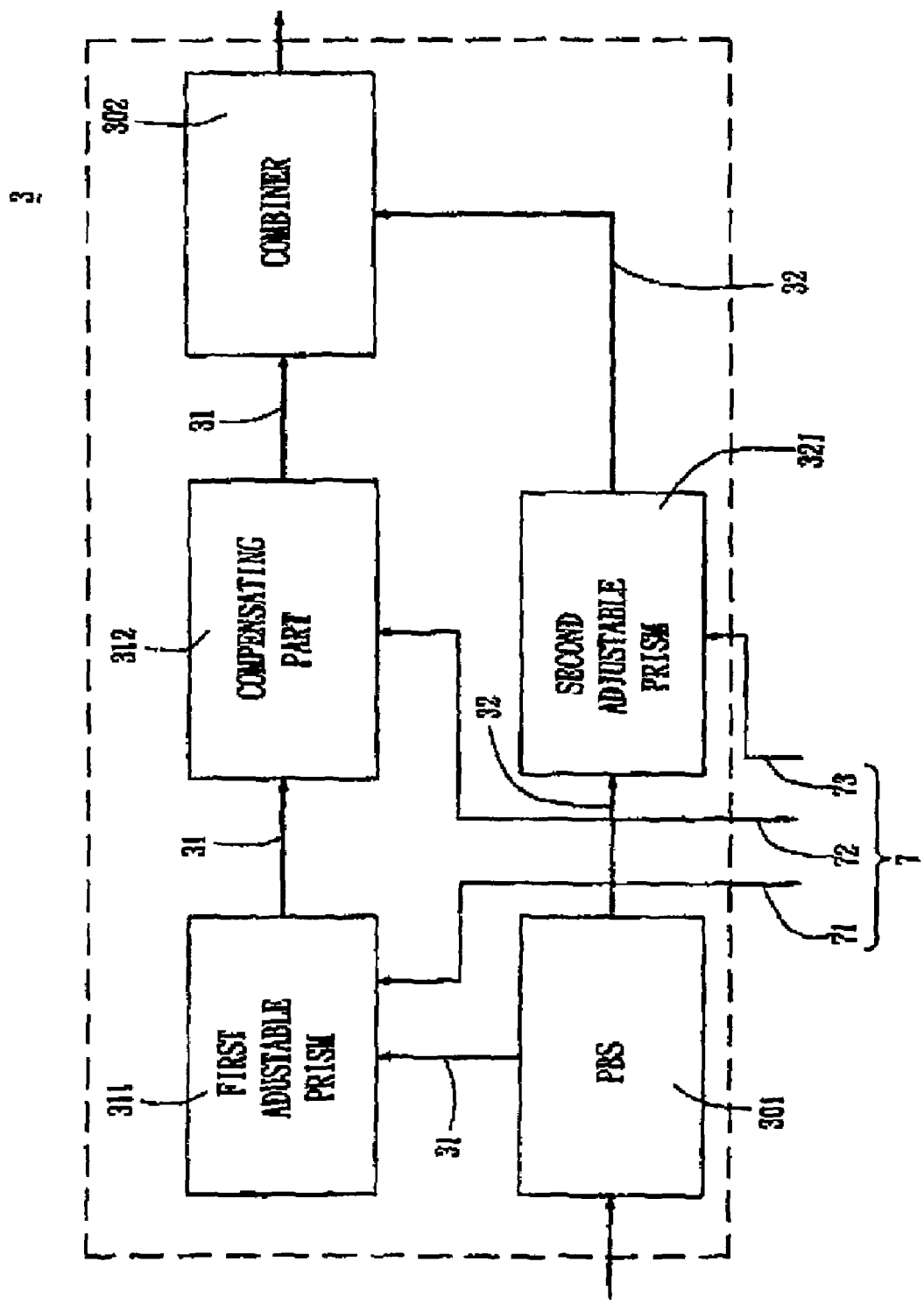
FIG. 1 shows a simplified block diagram of a PMD compensation module with a plurality of operation units, in accordance with the present invention.

Referring to FIG. 1, a PMD compensation module 100 in accordance with the present invention comprises a demultiplexer (DEMUX) 1, a plurality of first tap couplers from 2(#1) to 2(#N), a plurality of operation units from 3(#1) to 3(#N), a plurality of second tap couplers from 4(#1) to 4(#N), a multiplexer (MUX) 5 and a signal processing center (SPC) 6 electrically connecting with the operation units from 3(#1) to 3(#N).

The demultiplexer 1 separates a wavelength division multiplexing (WDM) optical input into a plurality of optical signals according to different wavelengths. The first tap couplers from 2(#1) to 2(#N) receive corresponding optical signals having different wavelengths from the demultiplexer 1, respectively. Each first tap coupler 2 outputs a first part of the received optical signal to the SPC 6, and outputs a remaining part of the received optical signal to the corresponding operation unit 3. Each operation unit 3 receives an electrical control signal 7 from the SPC 6, and compensates the optical signal received from the corresponding first tap coupler 2 under the control of the electrical control signal 7, respectively. Each second tap coupler 4 receives an optical signal from the corresponding operation unit 3. Each second tap coupler 4 outputs a first part of the received signal to the SPC 6, and outputs a remaining part of the received signal to the multiplexer 5. The multiplexer 5 multiplexes the received optical signals having different wavelengths from all the second tap couplers from 4(#1) to 4(#N) to form an optical WDM output.

The SPC 6 receives the first part of the optical signal from each of the first tap couplers from 2(#1) to 2(#N) and uses these signals to determine whether the dispersion of the received optical signals are within a predetermined acceptable range. If not, the SPC 6 transmits the appropriate electrical control signals 7 to the corresponding operation units 3 to compensate the optical signals. The SPC 6 also receives an optical signal from each of the second tap couplers from 4(#1) to 4(#N) to check whether the compensated optical signals coming from the operation units from 3(#1) to 3(#N) are within a predetermined acceptable range. The operation and implementation of such an SPC is well known to a person skilled in the art. Therefore, a detailed description of such operation and implementation is omitted herefrom.

Figure 2:
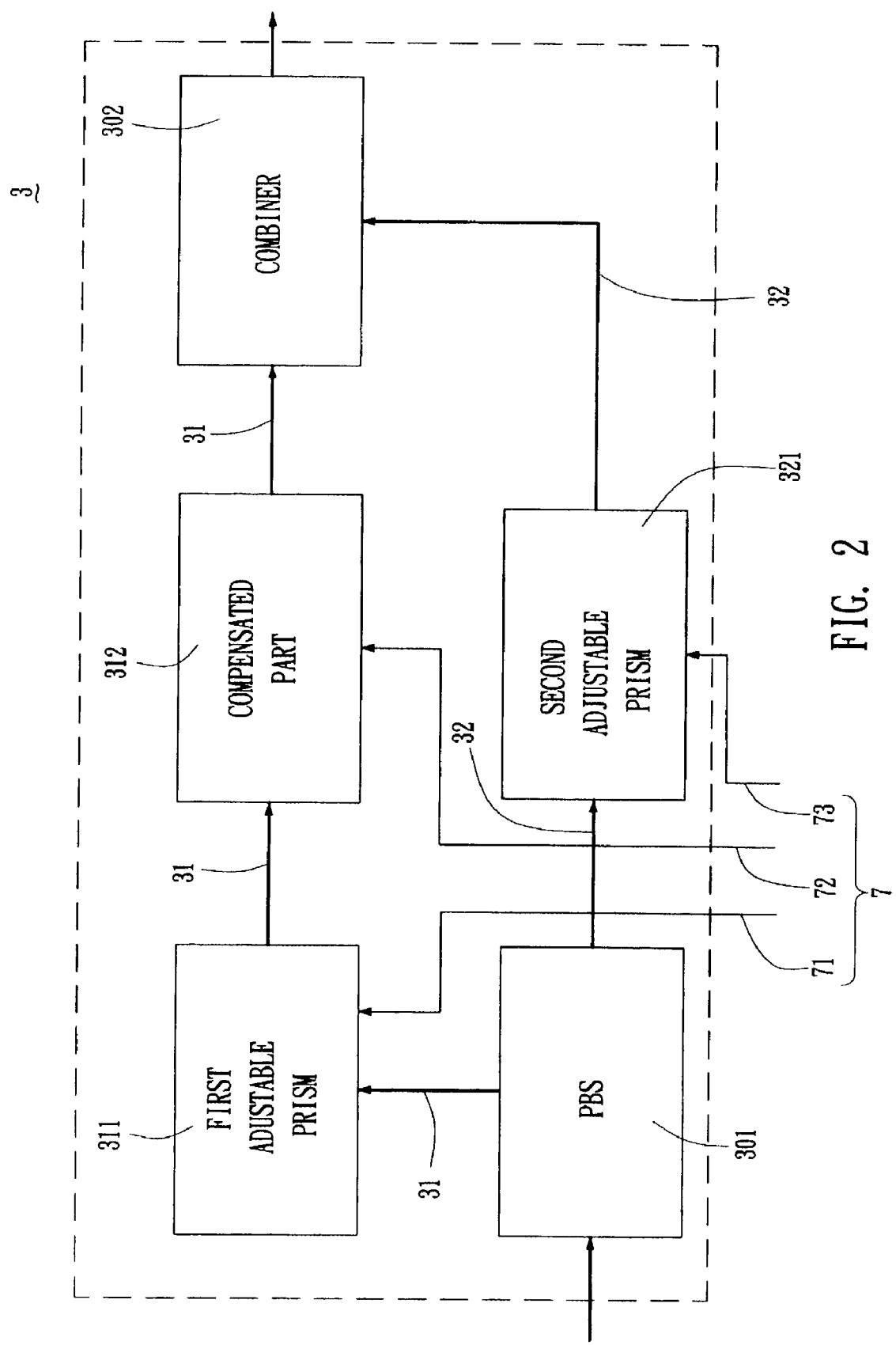
FIG. 2 is a detailed block diagram of one of the operation units shown in FIG. 1, wherein the operation unit comprises a compensating part.

Referring also to FIG. 2, each operation unit 3 comprises a polarization beam splitter (PBS) 301, a first adjustable crystal 311, a compensating part 312, a combiner 302 and a second adjustable crystal 321. The PBS 301 receives the remaining part of the optical signal from the corresponding first tap coupler 2, and separates the received optical signal into a first polarized signal 31 and a second polarized signal 32. The first polarized signal 31 and the second polarized signal 32 are orthogonally polarized with respect to one another. The first polarized signal 31 outputted from the PBS 301 travels through the first adjustable crystal 311, and then passes into the compensating part 312. A desired delay is precisely applied to the first polarized signal 31 by the compensating part 312, and the resulting first polarized signal 31 is coupled to a first input of the combiner 302. The second polarized signal 32 outputted from the PBS 301 travels through the second adjustable crystal 321, and then passes to a second input of the combiner 302. The first adjustable crystal 311 cooperates with the second adjustable crystal 321 to apply a predetermined delay between the first polarized signal 31 and the second polarized signal 32, which will be described in detail hereinafter. The combiner 302 recombines the first polarized signal 31 received from the compensating part 312 and the second polarized signal 32 received from the second adjustable crystal 321. An optical signal with little or no polarization mode dispersion then passes into the corresponding second tap coupler 4.

Furthermore, each electrical control signal 7 transmitted from the SPC 6 to the corresponding operation unit 3 further comprises a first control signal 71 connecting with the first adjustable crystal 311, a second control signal 73 connecting with the second adjustable crystal 321 and a third control signal 72 connecting with the compensating part 312. The first adjustable crystal 311 has an optical axis (not shown) and a surface (not shown) parallel to the optical axis. When an unpolarized light (not shown) is perpendicularly incident on the surface of the first adjustable crystal 311, the light is divided into an ordinary ray (O-ray) (not shown) with a polarized direction called the O-ray polarization direction and an extraordinary ray (E-ray) (not shown) with a polarized direction called the E-ray polarization direction. In this particular situation, the O-ray and E-ray travel in the first adjustable crystal 311 in the same direction and with different speed, and the O-ray polarization direction is orthogonal with the E-ray polarization direction. In a first state, the first polarized signal 31 is perpendicularly incident on the surface of the first adjustable crystal 311 and the polarization direction of the first polarized signal 31 is parallel to the O-ray polarization direction, and the first polarized signal 31 travels through the first adjustable crystal 311 as the O-ray. In a second state, the first polarized signal 31 is perpendicularly incident on the surface of the first adjustable crystal 311 and the polarization direction of the first polarized signal 31 is parallel to the E-ray polarization direction, and the first polarized signal 31 travels through the first adjustable crystal 311 as the E-ray. One of the first state and the second state in which the first polarized signal 31 travels faster in the first adjustable crystal 311 is called the fast state, and the other state is called the slow state. The first polarized signal 31 travels through the first adjustable crystal 311 in the fast state or the slow state in the same direction. Thus, the first polarized signal 31 has a short light path or a long light path in the first adjustable crystal 311 according to movement of the first adjustable crystal 311 under the control of the first control signal 71. The operation of such an adjustable crystal is well known, and need not be described in further detail. Similarly, the second adjustable crystal 321 has the same structure as the first adjustable crystal 311. The second polarized signal 32 travels through the second adjustable crystal 321 in a fast state or a slow state in the same direction. Thus, the second polarized signal 32 also has a short light path or a long light path in the second adjustable crystal 321 according to movement of the second adjustable crystal 321 under the control of the second control signal 73. The SPC 6 receives the first part of the optical signal from each first tap coupler 2, uses the signal to detect the dispersion between the two orthogonal polarization modes of the received signal, and controls the corresponding first and second polarized signals 31, 32 of the remaining part of the optical signal to have a short and a long (or a long and a short) light path in the first and second adjustable crystals 311, 321, respectively. Thus, the SPC 6 quickly applies a predetermined delay between the first polarized signal 31 and the second polarized signal 32 by means of the first and second control signals 71, 73.

Figure 3:
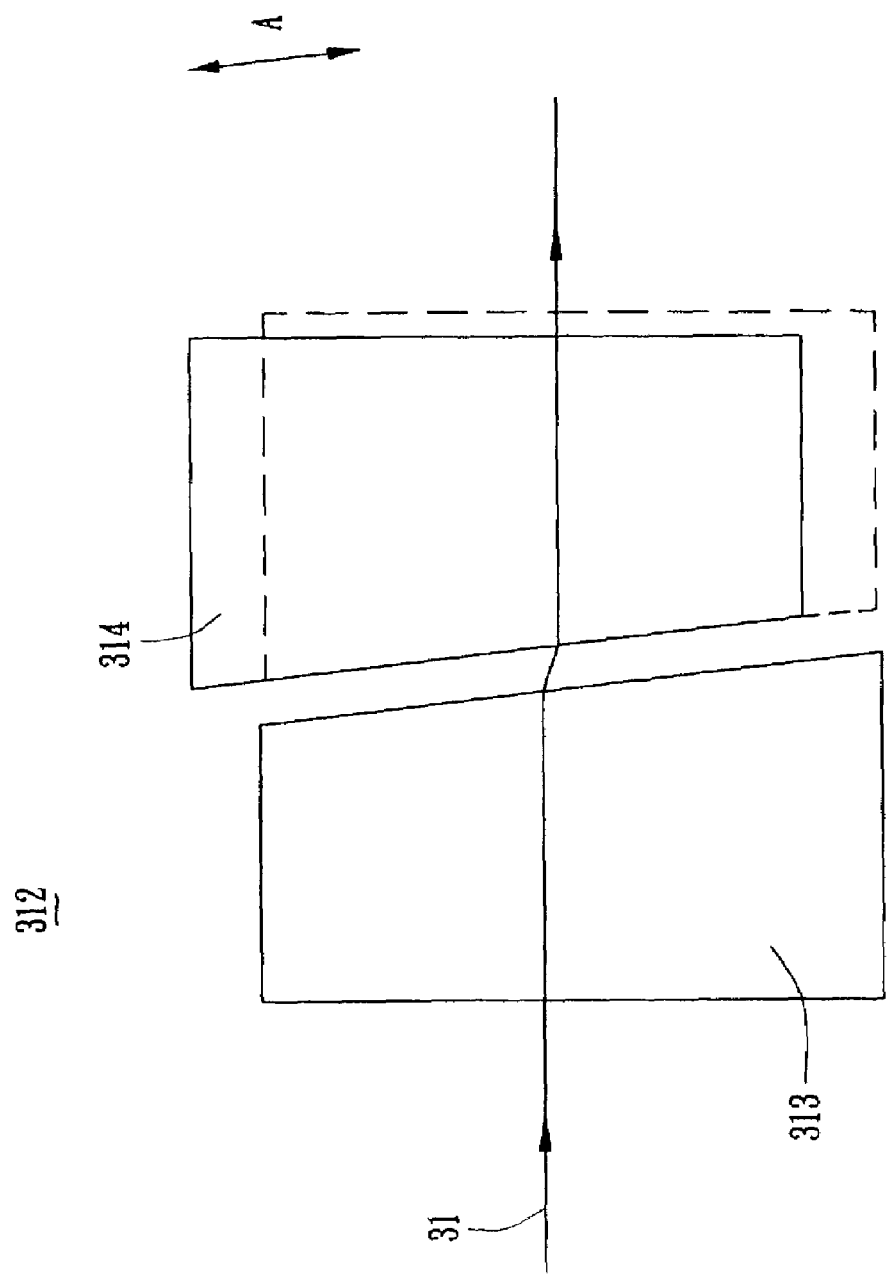
FIG. 3 is a schematic view of the compensating part shown in FIG. 2.

Referring to FIG. 3, the compensating part 312 comprises a trapezoidal fixed prism 313 and a trapezoidal movable prism 314. The first polarized signal 31 travels through the fixed prism 313 and the movable prism 314 in series. The fixed prism 313 comprises an inner surface (not labeled) opposing the movable prism 314. The movable prism 314 comprises an inner surface (not labeled) opposing the fixed prism 313. The movable prism 314 can move in two opposing directions as designated by the arrow A. These directions are parallel to the inner surface of the movable prism 314. A distance between the inner surface of the movable prism 314 and the inner surface of the fixed prism 313 always remains constant. The movable prism 314 has a uniform index of refraction. When the movable prism 314 slides downwardly along the direction A from a first position (shown as a solid line) to a second position (shown as a dashed line), the light path of the first polarized signal 31 in the movable prism 314 is elongated while the direction of the light path stays the same. When the movable prism 314 slides upwardly along the direction A, the light path of the first polarized signal 31 in the movable prism 314 is shortened while the direction of the light path stays the same. Thus, a continuously variable delay is precisely applied to the first polarized signal 31 by moving the movable prism 314 in the directions A under the control of the third control signal 72 (see especially FIG. 2).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A polarization mode dispersion (PMD) compensation module comprising;
    a polarization beam splitter (PBS) separating an optical input into a first polarized signal and a second polarized signal, wherein the first polarized signal and the second polarized signal are substantially polarized orthogonally with respect to one another,
    a signal processing center;
    a first adjustable crystal, the first polarized signal traveling through the first adjustable crystal either fast or slow depending upon commands from the signal processing center, which receives a portion of the optical input;
    a second adjustable crystal, the second polarized signal traveling through the second adjustable crystal either fast or slow depending upon commands from the signal processing center;
    a compensating part, at least one of the first polarized signal and the second polarized signal traveling through the compensating part, and the light path of the at least one of the first polarized signal and the second polarized signal being continuously varied in length; and
    a combiner combining the first polarized signal and the second polarized signal, which respectively pass through the first and second adjustable crystals and the compensating part into an optical output.

2. The PMD compensation module as described in claim 1, wherein the signal processing center electrically connects with the compensating part for controlling compensation of the first polarized signal by the compensating part.

3. The PMD compensation module as described in claim 1, wherein the first polarized signal has a short light path or a long light path in the first adjustable crystal according to a position of the first adjustable crystal.

4. The PMD compensation module as described in claim 1, wherein the second polarized signal has a short light path or a long light path in the second adjustable crystal according to a position of the second adjustable crystal.

5. The PMD compensation module as described in claim 1, wherein the compensating part comprises a movable prism, and the light path of the first polarized signal in the movable prism is varied in length according to a position of the movable prism.

6. The PMD compensation module as described in claim 5, wherein the compensating part further comprises a fixed prism, the first polarized signal travels through the fixed prism and the movable prism in series, and the direction of the light path of the first polarized signal stays substantially the same regardless of the position of the movable prism.

7. The PMD compensation module as described in claim 6, wherein the fixed prism and the movable prism are trapezoidal in shape.

8. The PMD compensation module as described in claim 6, wherein the fixed prism comprises an inner surface opposing the movable prism, the movable prism comprises an inner surface opposing the fixed prism, the movable prism moves in a direction parallel to the inner surface of the movable prism, and a distance between the inner surfaces of the fixed and movable prisms remains constant.

9. A polarization mode dispersion (PMD) compensation module comprising:
   a demultiplexer separating a wavelength division multiplexing (WDM) optical input into a plurality of optical signals according to different wavelengths;
   a plurality of operation units each receiving a corresponding optical signal of different wavelengths from the demultiplexer respectively, and each operation unit comprising:
      a polarization beam splitter (PBS) separating the optical signal received from the demultiplexer into a first polarized signal and a second polarized signal, wherein the first polarized signal and the second polarized signal are substantially polarized orthogonally with respect to one another;
      a first adjustable crystal;
      a compensating part, the first polarized signal outputted from the PBS traveling through the first adjustable crystal and the compensating part, the compensating part comprising a fixed prism and a movable prism, the first polarized signal traveling through the fixed prism and the movable prism in series, with the direction of the light path of the first polarized signal staying substantially the same regardless of the position of the movable prism, and the light path of the first polarized signal in the movable prism being varied in length according to a position of the movable prism; and
      a combiner combining the first polarized signal received from the compensating part and the second polarized signal received from the PBS into one optical signal; and
   a multiplexer multiplexing the optical signals received from the combiners of the operation units, said optical signals having different wavelengths, to form an optical output.

10. The PMD compensation module as described in claim 9, further comprising a second adjustable crystal positioned in the light path of the second polarized signal between the PBS and the combiner.

11. The PMD compensation module as described in claim 10, further comprising at least one signal processing center electrically connecting with the compensating part of each operation unit for controlling compensation of the first polarized signal by the compensating part.

12. The PMD compensation module as described in claim 11, wherein the first polarized signal has a short light path or a long light path in the first adjustable crystal according to a position of the first adjustable crystal.

13. The PMD compensation module as described in claim 12, wherein the second polarized signal has a short light path or a long light path in the second adjustable crystal according to a position of the second adjustable crystal.

14. The PMD compensation module as described in claim 9, wherein the fixed prism comprises an inner surface opposing the movable prism, the movable prism comprises an inner surface opposing the fixed prism, the movable prism moves in a direction parallel to the inner surface of the movable prisms and a distance between the inner surfaces of the fixed and movable prisms remains constant.

15. A method of providing a light with a continuously variable PMD (polarization mode dispersion) compensation, comprising steps of:
   providing a polarization beam splitter (PBS) for separating an incoming light into first and second polarized signals substantially polarized orthogonally with respect to each other;
   providing first and second adjustable crystals for having said first and second polarized signals travel therethrough either fast or slow depending upon commands from a signal processing center which receives a portion of the incoming light;
   providing at least one of said first and second polarized signals with a compensating part which provides a continuously variable light path for said at least one of said first and second polarized signals; and
   providing a combiner to recombine said first and second polarized signals, which respectively pass through the first and second adjustable crystals and the compensating part, to be one outgoing light.

16. The method as described in claim 15, wherein said signal processing center is connected to said outgoing light.

17. The PMD compensation module as described in claim 15, wherein the compensating part comprises a movable prism, and the light pat of the first polarized signal in the movable prism is varied in length according to a position of the movable prism.

* * * * *